(No Model.)
B. F. MYERS.
TWO WHEELED VEHICLE.
No. 373,090. Patented Nov. 15, 1887.
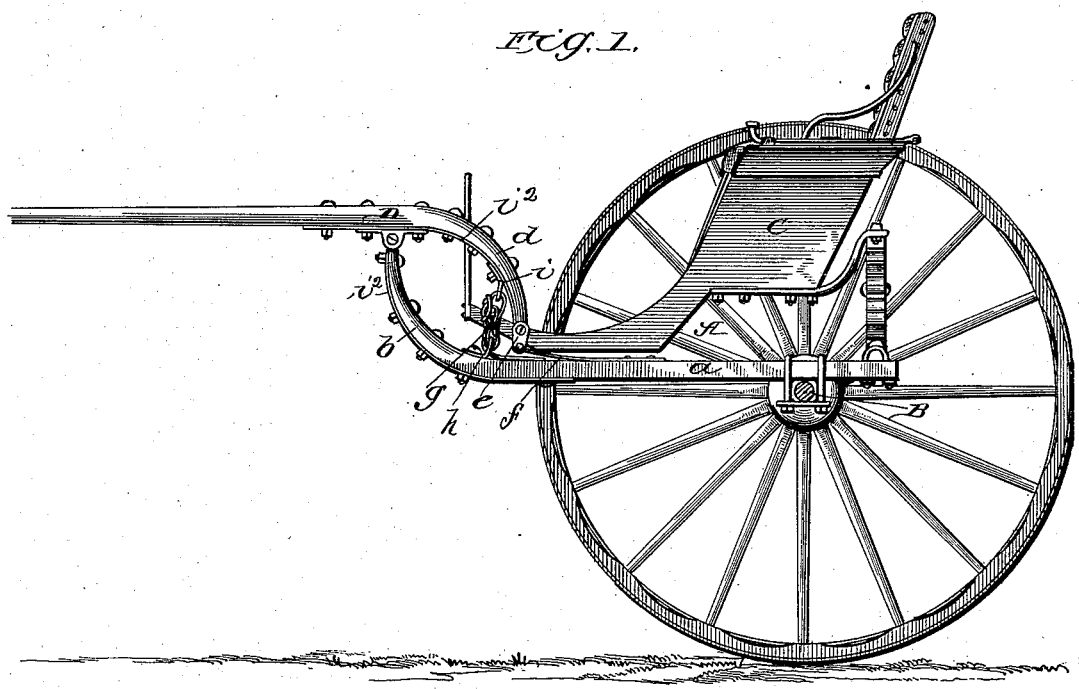
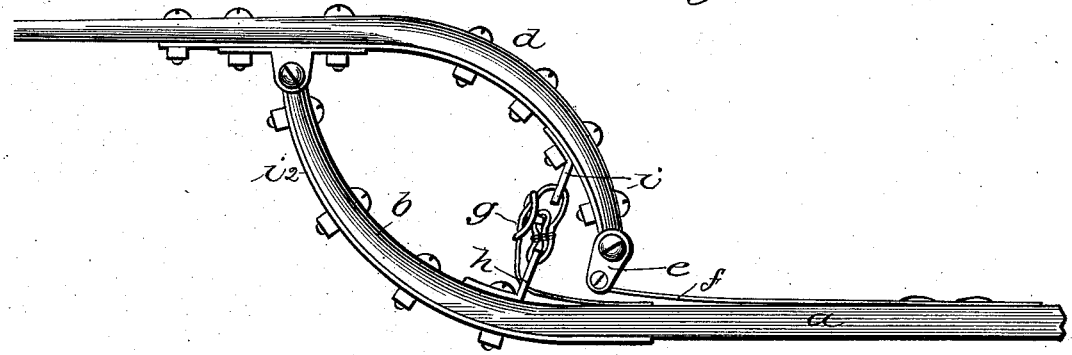
Witnesses
Jos. A. Ryan
E. G. Siggers
Inventor
B. Frank Myers
By his Attorneys

UNITED STATES PATENT OFFICE.

B. FRANK MYERS, OF WASHINGTON, ILLINOIS.

TWO-WHEELED VEHICLE.

SPECIFICATION forming part of Letters Patent No. 373,090, dated November 15, 1887.

Application filed July 13, 1887. Serial No. 244,152. (No model.)

*To all whom it may concern:*

Be it known that I, B. FRANK MYERS, a citizen of the United States, residing at Washington, in the county of Tazewell and State of Illinois, have invented a new and useful Improvement in Road-Carts, of which the following is a specification.

My invention relates to road-carts; and it consists in the improvements hereinafter described, whereby a simple, durable, and efficient article is provided, and one wherein the objectionable motion of the horse is not experienced by the occupants of the vehicle.

In the accompanying drawings, forming part of this specification, Figure 1 is a side view of a road-cart embodying my improvements, one of the carrying-wheels being removed to better show the invention; and Fig. 2 is a detail side view.

A designates the frame, having the axle B, upon which the carrying-wheels are mounted.

The body C may be supported upon the frame in any preferred manner. I have shown one mode of supporting the body in the drawings; but I do not wish to be limited thereto.

The side bars, $a$, of the frame A are extended forward to form arms $b$, which are curved upward at their front ends, as illustrated, which ends are pivotally attached to the under side of the thills or shafts D D. The rear end portion, $d$, of each shaft is curved downward and is connected by an oscillating link, $e$, with the front end of a flat spring, $f$, which is secured at its rear end to the upper side of the side bar, $a$. A strap, $g$, is connected to each side bar, $a$, forward of the front end of the spring $f$, and said strap has a buckle adjustment by which it may be lengthened or shortened. Metallic loops $h\ i$ are respectively secured to each arm $b$ and each portion $d$ of the shaft, and through these loops pass the straps $g$, to limit the relative movements of the parts.

The under face of both the arms $b$ and portions $d$ may be re-enforced by a metallic strip, $i^2$, and the strip applied to each portion $d$ may be bent and perforated at its lower end to form the upper loop, $i$.

From the foregoing it will be apparent that the parts are so arranged and connected that they will move easily, while the draft-strength is not reduced.

Ordinarily the straps $g$ are so adjusted as to limit the extreme movement of the shafts, to prevent undue rearward movement of the body, but usually to shafts that do not jerk the loops.

The springs $f$, by being leaf-springs, enable the vertical vibration of the end of the shafts to be taken up or expended, thus doing away with horse motion, but at the same time afford such a connection with the body as will insure proper draft.

The link $e$ has two bearings, one in the front end of the spring $f$ and the other in the lower or rear end of the shafts, and this link oscillates in its bearings when the shafts or the side bars are moved vertically. The combination of the spring with this oscillating link gives an equable motion, devoid of any jostling horse motion. Another point of advantage resides in the fact that I connect and arrange the parts so it is easy to get in and out of the vehicle.

I claim—

1. The combination, in a road-cart, of a frame having bars $a$, extended and bent upward at their front ends, shafts pivotally secured to said bent ends and pivotally attached at their rear ends to the bars $a$, a spring secured upon the bars $a$ and connected to the ends of the shafts, and the strap $g$, connected to the bars $a$ and the shafts in front of the spring, substantially as described.

2. The combination, in a road-cart, of a frame having bars $a$, extended and bent upward, shafts pivotally connected to said bars and pivotally secured at their rear ends to the said bars, and a strap having a buckle adjustment connecting the said rear ends with said bars, substantially as described.

3. The combination, in a road-cart, of a frame having bars $a$, extending and bent upward, shafts pivotally connected to said bars and connected at their rear ends to leaf-springs attached to the frame, loops located on said bars and shafts, and a connecting-strap passing through said loops, substantially as described.

In testimony that I claim the foregoing as my own I have hereto affixed my signature in presence of two witnesses.

B. FRANK MYERS.

Witnesses:
F. S. HEIPLE,
R. B. DOUGHERTY.